United States Patent [19]
Heinen

[11] 3,793,893
[45] Feb. 26, 1974

[54] VALVE ACTUATING MEANS
[75] Inventor: Irving J. Heinen, Lakewood, Calif.
[73] Assignee: Aerojet-General Corporation, El Monte, Calif.
[22] Filed: July 10, 1972
[21] Appl. No.: 270,339

[52] U.S. Cl. .................................. 74/22, 251/229
[51] Int. Cl. ........................................... F16h 21/00
[58] Field of Search... 74/89.15, 625, 22, 424.8 VA; 251/266, 229

[56] References Cited
UNITED STATES PATENTS
| | | | |
|---|---|---|---|
| 3,046,802 | 7/1962 | Cupedo ............................... | 74/22 |
| 3,327,826 | 6/1967 | Henschke ..................... | 74/424.8 VA |
| 3,207,468 | 9/1965 | Lauducci et al. .................. | 74/89.15 |
| 3,315,413 | 4/1967 | Beecher et al. ..................... | 74/89.15 |

Primary Examiner—Leonard H. Gerin
Assistant Examiner—Wesley S. Ratliff, Jr.
Attorney, Agent, or Firm—Whann & McManigal

[57] ABSTRACT

Actuating means for a valve, particularly of the plug type, which is movable between operative positions by successive modes of movement, one being axially and another rotationally, wherein a rotatably driven nut is in threaded engagement with a valve stem, a cam controlled device acting respectively at predetermined positions of the nut so as to permit relative movement of the nut so as to move the stem in the axial mode, and to connect the nut and stem for unitary rotation so as to move the stem in the rotational mode, guiding means being provided for the stem, so that it cannot be moved in a subsequent mode until the prior mode has first been completed.

12 Claims, 11 Drawing Figures

VALVE ACTUATING MEANS

BACKGROUND OF THE INVENTION

The present invention relates to the field of valves. Heretofore, it has been generally known from U. S. Pat. No. 2,795,960, to provide plug valve actuating means in which the rotation of a hand-wheel will first lift the plug off of its seat, and then rotate the plug from a closed to an opened position, or vise versa.

While the actuating means disclosed in the aforementioned patent produces the desired operating characteristics, the rather complicated design is such that the valve is rather difficult to fabricate and relatively expensive to build.

The present invention therefore constitutes an improvement over the actuating means disclosed in the patent, and seeks generally to modify and rearrange the component parts so as to not only obtain a greatly simplified arrangement which can be more economically produced, but which can also be utilized to provide additional desirable attributes, for example, a positive visual indication as to whether the valve is in an opened or a closed position.

SUMMARY OF THE INVENTION

The present invention relates generally to valve actuating means, and is more particularly concerned with improved means for moving the valve axially off the valve seat, and rotating it to an opened position, and vise versa.

One object of the present invention is to provide improved valve opening and closing means, wherein the component parts coact automatically, upon continued movement of a driven element in one direction, to first lift the valve from its seated position and then rotate the valve into an opened position, or vise versa.

A further more specific object is to provide valve actuating means according to the foregoing object, wherein means for selectively determining and limiting the axial and rotational movements of the valve actuating stem are longitudinally spaced of the stem from the means for locking and releasing the rotatable driven means with respect to the stem for unitary and relative movements.

A still further object is to provide valve actuating means which are operable through the valve stem to lift and rotate the valve, in going from one operating position to the other, and wherein the valve stem positon serves as a positive indication of the valve orientation and shows whether it is in an opened or a closed position.

Another object is to provide improved locking means for valves of the type described herein, in which a cam member controls the operation of a locking roller for connecting and disconnecting a rotatable driven element with respect to a valve operating stem.

Still another object is to provide control means for such valves, which utilizes a unique L-groove and pin guide means for controlling movements of the valve stem during opening and closing movements of the valve.

Further objects and advantages of the invention will be brought out in the following part of the specification, wherein detailed description is for the purpose of fully disclosing one embodiment of the invention without placing limitations thereon.

BRIEF DESCRIPTION OF THE DRAWINGS

Referring to the accompanying drawings, which are for illustrative purposes only.

Description of a Preferred Embodiment

Figure 1:
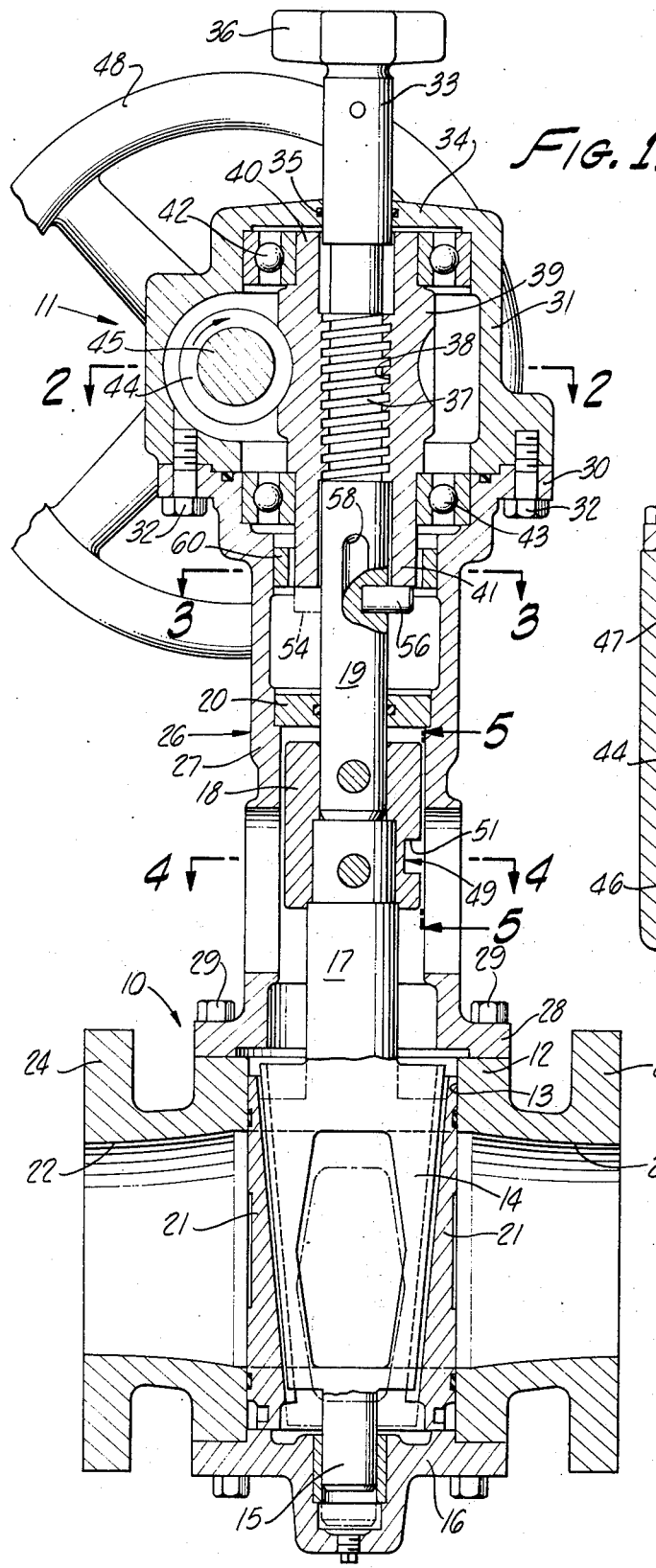
FIG. 1 is a longitudinal sectional view of a valve according to the present invention.

Referring more specifically to the drawings, there is shown a valve mechanism, indicated generally at 10, and a valve actuator indicated generally at 11.

The valve mechanism 10 is of the general type disclosed in detail in U.S. Pat. No. 3,362,433, issued Jan. 9, 1968. Briefly, the valve mechanism 10 comprises a valve body 12 having a cylindrical bore 13 therein open at the ends and providing a chamber for the operative reception of a valve plug 14 of generally wedge-shaped configuration, this plug being axially supported for rotational and limited raising and lowering movements upon a bottom stub shaft 15 having a bearing support in a lower end closure plate 16, and a valve stem 17 connected by a coupling 18 to a stem 19 of the actuator and which is supported in a bearing bushing 20.

The valve plug 14 is operatively associated with similarly constructed slip member 21, 21 diametrically positioned on opposite sides of the valve plug. The plug and slips are interconnected for relative sliding movement by means of conventional dove-tail groove and tenon connections after the manner and for operating association as disclosed in the aforementioned patent.

For clarity in FIG. 1, the valve closed position of the plug 14 is indicated in phantom lines, and the raised position, prior to rotation to fully opened valve position, is shown in full lines. The valve stem 17 and connected parts of the actuating means are shown in an operative position corresponding to that for a fully opened valve.

From the bore 13, radially extending fluid passages 22 and 23 in the valve body provide communication with connection flanges 24 and 25, respectively, whereby the valve body may be connected with associated conduits or pipes in the usual manner.

The valve actuator 11 is supported upon a bonnet 26 which includes an elongate tubular structure 27 having a connection end flange 28 which is connected in coaxial relation to the bore 13 on the valve body by means of appropriate retaining bolts 29. At its uppermost end, the tubular structure 27 is formed with a connection end flange 30 which is connected with the periphery of a gear housing 31 of the actuator by means of appropriate retaining bolts 32.

As shown in FIG. 1, the stem 19 is carried upwardly through the gear housing 31 and has an upper end portion 33 extending through a top wall 34 of the housing in which it is sealed by an appropriate ring seal 35. The projecting portion 33 of the stem is provided with a cross member 36 or other appropriate indicating means for showing the orientation of the valve; that is, whether the valve is opened or closed. A direct indication is thus provided, and since the valve stem connects directly with the valve, alignment of the cross-member 36 with the longitudinal axis of the valve body 12 will indicate that the valve is in opened position, whereas with the cross-member extending transversely of the valve body, there will be an indication that the valve is closed.

Figure 2:
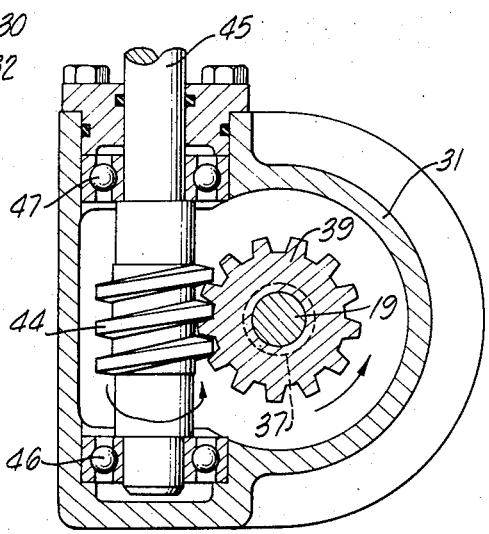
FIG. 2 is a transverse sectional view, taken substantially on line 2—2 of FIG. 1.

Within the gear housing, the stem 19 is constructed with an externally threaded portion 37 which is in threaded relation with internal threads 38 of a surrounding worm gear 39. The worm gear 39 constitutes rotatable driven means for producing the desired movement of the stem 19, as will hereinafter be described in detail. The worm gear is formed with upper and lower end hub portions 40 and 41 which are respectively supported in suitable anti-friction bearings 42 and 43. The worm gear 39 meshes with a worm 44 carried by a transversely extending drive shaft 45, this shaft being supported in anti-friction bearing assemblies 46 and 47, as shown in FIG. 2. While the drive shaft 45 is shown in FIG. 1 as being connected with a hand-wheel 48 to provide manual operation, it is to be understood that the drive shaft may, if desired, be connected with suitable power means such as a hydraulic or electric motor.

From a consideration of the mounting arrangement of the worm gear and the stem 19, it will be appreciated that if the stem 19 is restrained against rotational movement, relative rotation of the worm gear 39 will serve to move the stem in its axial mode. Also, if the stem is constrained against axial movement and the worm gear and stem are interlocked for unitary rotation, rotational movement of the worm gear will effect movement of the stem in its rotational mode.

Figure 5A:
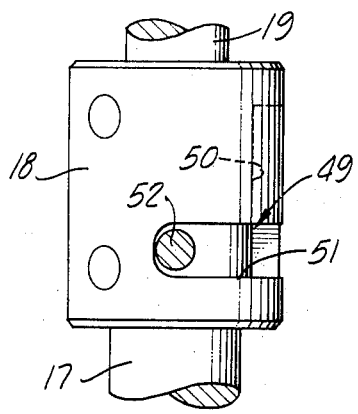
Figure 5B:
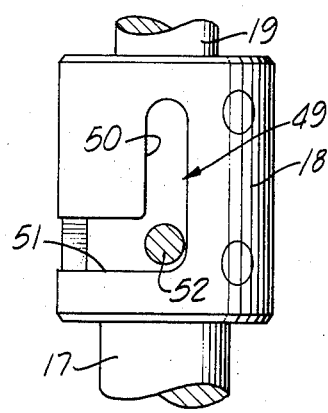
Figure 5C:
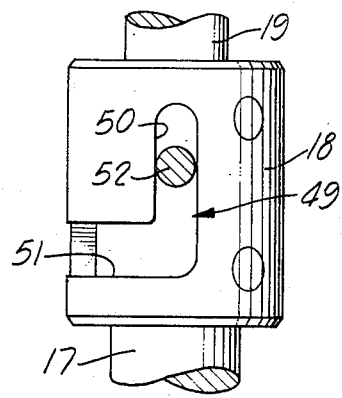

First means are therefore provided for guiding and limiting the stem movement to one mode, and opposing its movement in the other mode until such time as the first mode is completed. In the disclosed arrangement, the coupling 18 is utilized for this purpose, and as shown in FIGS. 5a, 5b and 5c the outer cylindrical surface of the coupling is fabricated with an L-shaped groove 49 in which one leg 50 extends axially of the longitudinal axis of the connected stems 17 and 19, and the other leg 51 extends circumferentially of the stem axis for an angle of substantially 90°. Operatively associated with the coupling is a guiding pin 52 which is fixedly supported on the tubular structure 27 of the bonnet by means of a mounting screw or bushing 53 so that the innermost end of the pin rides within the groove 49.

In the opened position of the valve, the pin 52 is positioned at the closed end of the leg 51 of the groove as shown in FIG. 5a. To close the valve, the coupling 18 will have to be rotated clockwise until the pin reaches a neutral position as shown in FIG. 5b. In this position, the coupling is released for axial downward movement so as to relatively position the pin 52 adjacent the upper closed end of the leg 50 of the groove 49. The stem structure is thus limited and guided in the cyclic movements necessary to carry the valve between its closed and fully opened positions.

Second means will now be described which are positioned adjacent the worm gear 39 in axial spaced relation to the first means as described above.

The lower end hub portion 41 of the worm gear is formed with a segmental end projection 54 which terminates at one end in an abutment shoulder 55 which is arranged to engage a radially extending pin 56 on the stem 19 when it is at the upper limit of its axial movement and during which time the guiding pin 52 is positioned in the groove leg 51. During this time, the worm gear 39 and stem 19 are interconnected for unitary rotative movement. For this purpose, the lower end hub portion 41 is provided with a radial opening or passage 57 which is aligned with a recess 58 formed in the outer surface of the stem 19. A roller 59 of appropriate diameter is positioned in the passage, this roller being movable into and out of the recess to respectively lock the worm gear and stem for unitary movement, and release the same for independent movements.

The release and locking operations are controlled by camming means which are shown as comprising a ring member 60 which is fixedly mounted within the tubular structure 27 as by press-fit of its outer periphery therein. The ring member is constructed with an inner peripheral edge of which a projecting portion forms a camming edge 61 which extends through a circumferential angle of substantially 90°. During movement of the roller 59 along this camming edge, the roller will be retained inwardly in a locking position within the recess 58 and interlock these parts for unitary movement. The remainder of the inner peripheral edge is constructed to provide a recessed camming edge portion 62 which extends circumferentially for substantially 270°. When the roller is associated with the camming edge 62, it is relieved so that it may move outwardly in the opening 57 to a non-locking or released position with respect to the recess 58, whereupon the parts may be independently relatively moved.

Figure 3A:
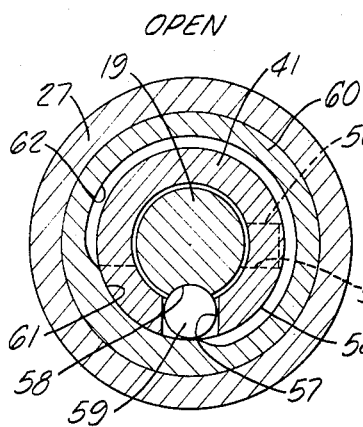
FIGS. 3a, 4a and 5a are sectional views taken substantially on lines 3—3, 4—4 and 5—5 of FIG. 1 showing the relative orientation of the components at these positions, when the valve is open.
Figure 3B:
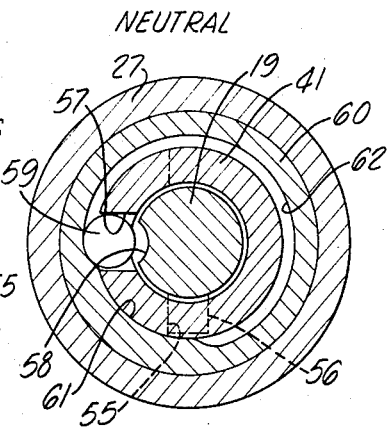
FIGS. 3b, 4b and 5b are similar sectional views, showing the relationship of the components, when the valve is in a neutral position between its opened and closed positions.
Figure 3C:
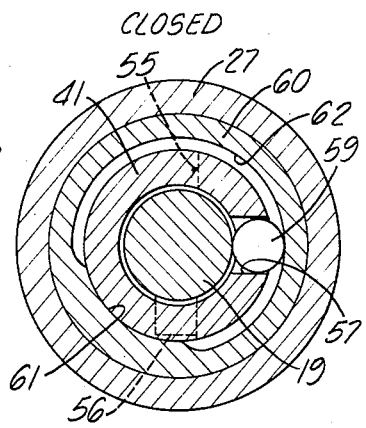
FIGS. 3c, 4c and 5c are similar sectional views, showing the orientation of the components in the closed position of the valve.
Figure 4A:
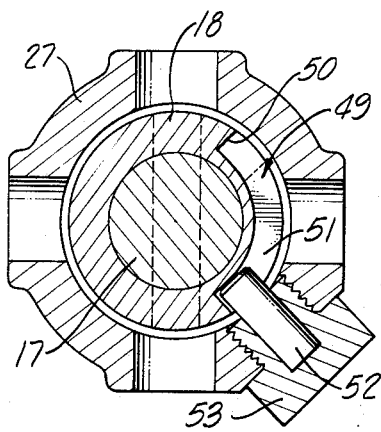
Figure 4B:
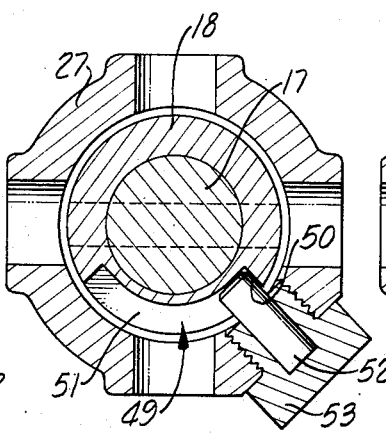
Figure 4C:
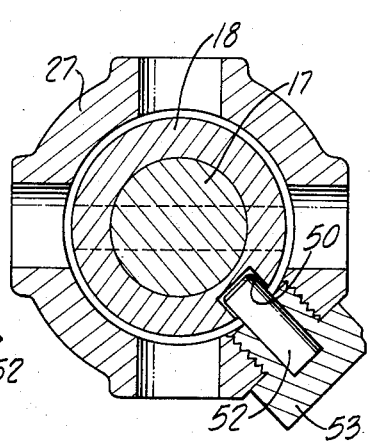

In operation—with the valve in open position, the components of the actuating means will be oriented as shown in FIGS. 3a, 4a and 5a. To close the valve, the worm gear 39 will be rotated in a clockwise direction so that the interlocked stem 19 and lower end hub portion 41 will be moved as a unit and carry the roller 59 along the camming edge 61. During this movement, the coupling 18 will correspondingly rotate until the pin 52 reaches the neutral position in the groove 49, as shown in FIG. 5b. At this position, the roller 59 will leave the camming edge 61 and engage the recessed camming edge 62 which permits the roller to move outwardly of the stem recess 58, as shown in FIG. 3b. Continued movement of the worm gear in a clockwise direction will relatively move the abutment shoulder 55 out of engagement with the pin 56, and due to this relative movement of the worm gear will act through the threads 37 and 38 in a manner to axially move the coupling 18 downwardly to carry the valve to a fully closed position wherein the guiding pin 52 will be adjacent the uppermost end of the groove leg 50 as shown in FIG. 5c. In the fully closed position of the valve, the roller 59 will be positioned along the camming edge 62 at an angular position of substantially 180°, more or less. To open the valve, the above cycle of operations will merely be reversed.

From the foregoing description and drawings, it will be clearly evident that the delineated objects and features of the invention will be accomplished.

Various modifications may suggest themselves to those skilled in the art without departing from the spirit of my invention, and, hence, I do not wish to be restricted to the specific form or forms shown or uses mentioned, except to the extent indicated in the appended claims.

I claim:

1. Actuating means for moving a valve between operative positions by successive movements, one of which is axial and the other rotational, comprising:
   a. means for moving said valve, including a stem supported for axial and rotational movements, said stem having a threaded part;
   b. rotatable driven means having threads coacting with the threads on said stem and being operable upon relative rotation to move the stem axially;
   c. first means at a position axially of said stem generally adjacent to said valve for limiting the extent of axial movement of said stem, and at one limit of said axial movement enabling limited rotational movement of said stem; and
   d. second means at a spaced position axially of said stem, generally adjacent said rotatable means and controlled by its movement for locking said stem and rotatable means together for limited unitary rotation.

2. Actuating means according to claim 1, wherein the stem carries a cross-member for indicating the operative position of the valve.

3. Actuating means according to claim 1, wherein the rotatable driven member comprises a worm gear having driving engagement with a worm.

4. Actuating means according to claim 1, wherein the first means comprises an annular wall element mounted coaxially around said stem and having an L-shaped groove positioned with one leg of the groove extending axially of the stem and the other leg extending circumferentially of the stem, and a pin element extending into said groove and being relatively movable therealong, one of said elements being affixed to and movable with said stem, and the other being fixed.

5. Actuating means according to claim 4, wherein the wall element is carried by the stem.

6. Acutating means according to claim 3, wherein the worm gear has an end hub projecting portion, and the stem carries a radially extending pin engaged by said portion at a predetermined axial position of said stem.

7. Actuating means according to claim 6, in which the projecting portion is segmental and has an end abutment shoulder engageable with said pin.

8. Actuating means according to claim 1, wherein said second means includes a peripheral recess in said stem, a radial opening in said rotatable means alignable with said recess at a predetermined position of said stem, and a roller in said radial opening movable into and out of said recess to respectively lock the rotatable means and stem for unitary movement and release the same for independent movements.

9. Actuating means according to claim 8, wherein the second means further includes camming means operable to control the movement of said roller.

10. Actuating means according to claim 9, wherein the camming means comprises a fixed ring member with a peripheral camming edge.

11. Actuating means according to claim 10, wherein the ring member is positioned radially outwardly of the associated portion of said rotatable means.

12. Actuating means according to claim 10, wherein the camming edge is formed to retain the roller in the recess of the stem during a rotational movement of substantially 90°.

* * * * *